May 22, 1962   C. J. NUTTALL, JR., ET AL   3,035,654
ARTICULATED TRACKED VEHICLES
Filed Feb. 21, 1958   6 Sheets-Sheet 5

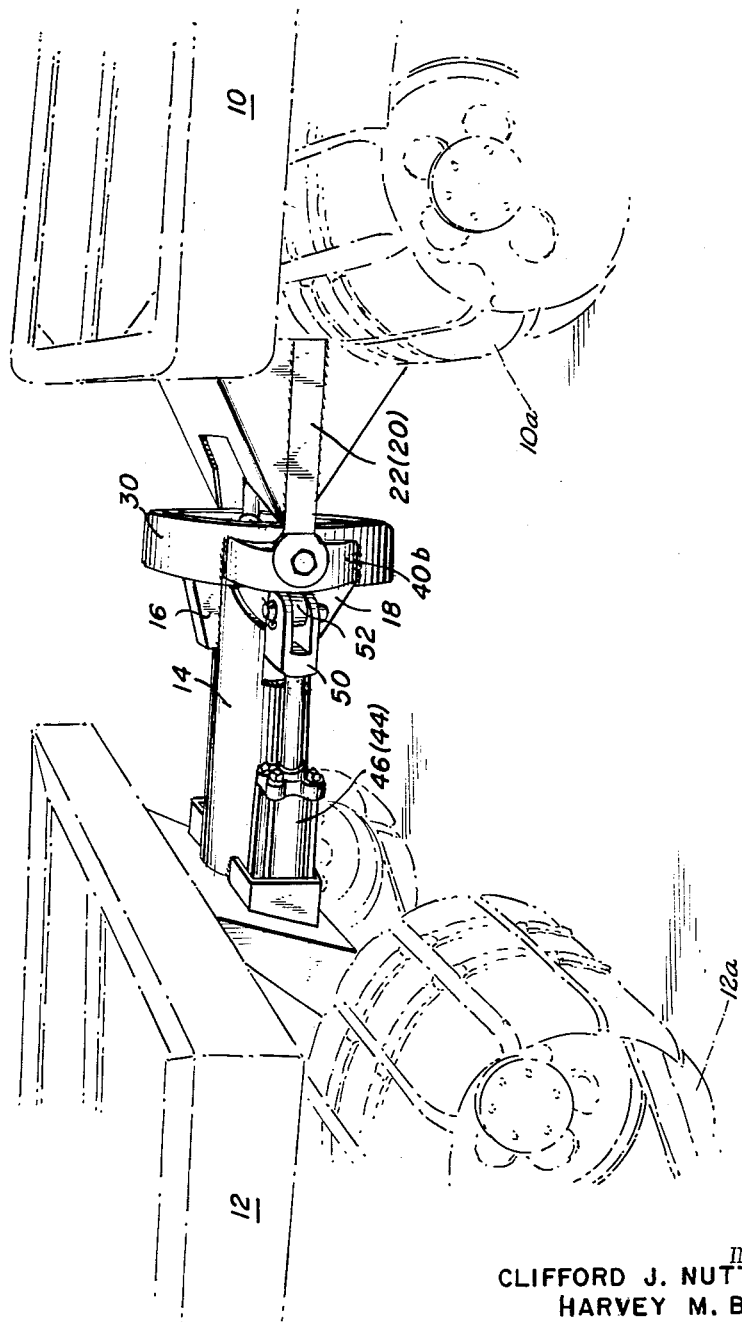

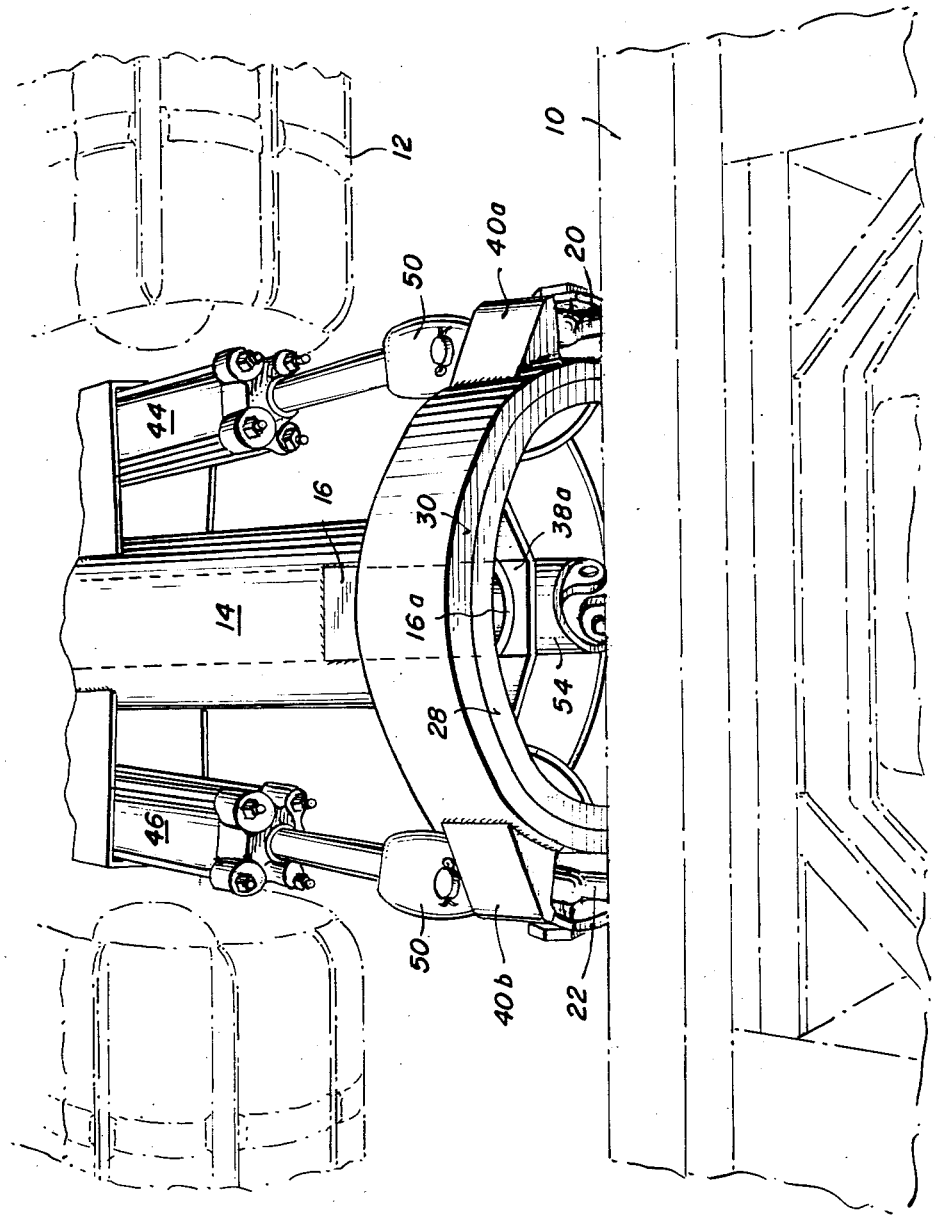

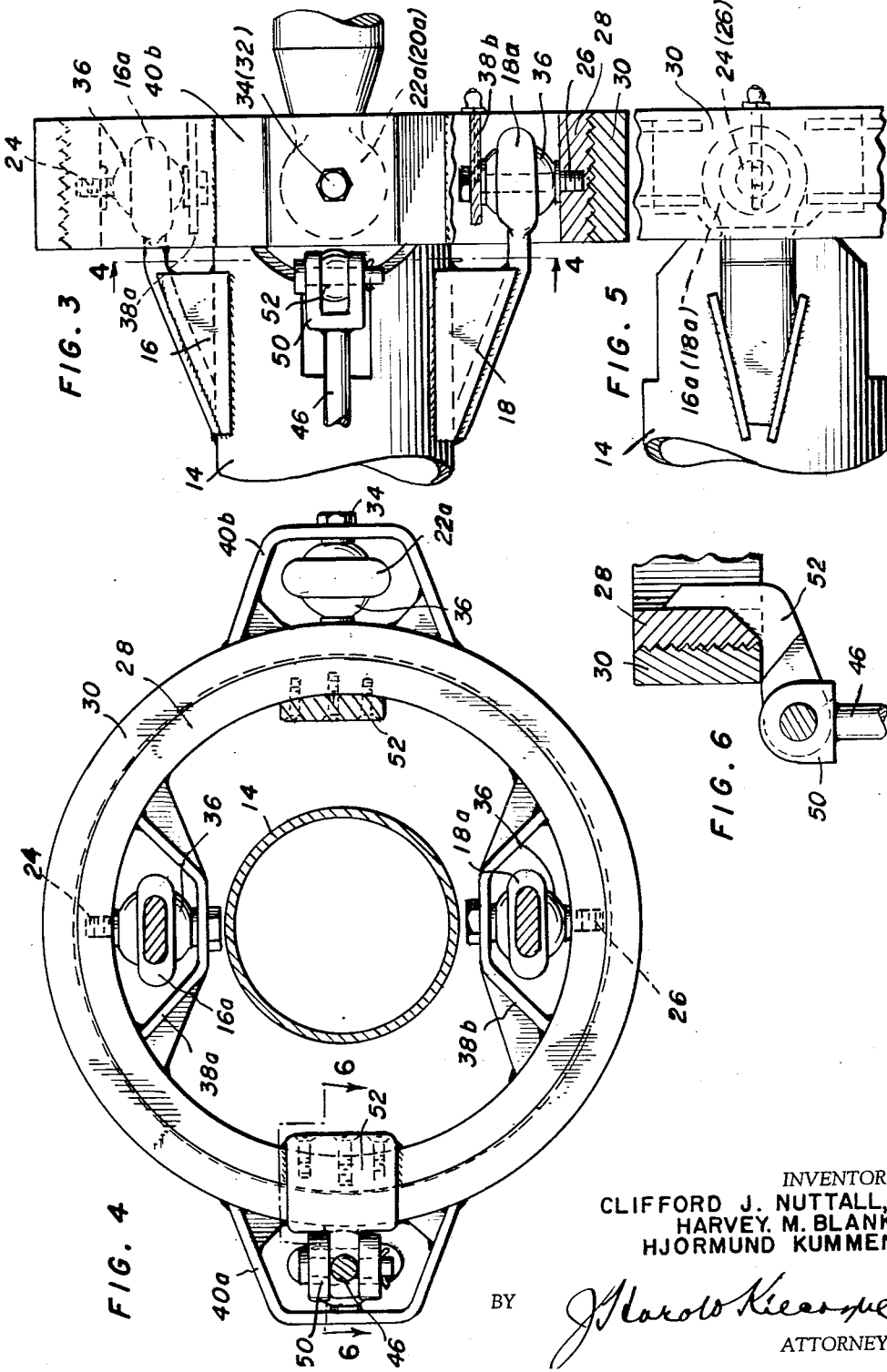

INVENTORS
CLIFFORD J. NUTTALL, Jr.
HARVEY M. BLANK
HJORMUND KUMMEN
BY
ATTORNEY

May 22, 1962  C. J. NUTTALL, JR., ET AL  3,035,654
ARTICULATED TRACKED VEHICLES
Filed Feb. 21, 1958  6 Sheets-Sheet 6

INVENTORS
CLIFFORD J. NUTTALL, Jr.
HARVEY M. BLANK
HJORMUND KUMMEN
ATTORNEY

United States Patent Office

3,035,654
Patented May 22, 1962

3,035,654
ARTICULATED TRACKED VEHICLES
Clifford J. Nuttall, Jr., and Harvey M. Blank, Rock Hall, Md., and Hjormund Kummen, Manotick, Ontario, Canada, assignors to Wilson, Nuttall, Raimond Engineers, Inc., Chestertown, Md., a corporation of Maryland
Filed Feb. 21, 1958, Ser. No. 716,676
10 Claims. (Cl. 180—14)

This invention relates to improvements in articulated transport vehicles, and more particularly to an improved articulated transport vehicle incorporating vehicle-unit articulating mechanism so constructed as to permit higher speeds without over-stressing the vehicle frames, suspension or the coupling itself and which also incorporates means to accomplish the steering of the vehicle by chassis articulation.

While the concept of steering articulated vehicles by chassis articulation is not new per se, the major drawback to full realization of the potential advantages thereof has been limited by the attempt to achieve optimum riding smoothness through the employment of an articulating joint between the vehicle sections or units providing freedom of movement about the longitudinal and vertical axes, but complete rigidity in the pitch plane. While it is true that such a configuration will realize the maximum ride smoothness possible in a given wheelbase, it is equally true that the joint structure must necessarily cope with the high bending stresses implicit in the long rigid configuration. It is the primary objective of this invention to achieve in an articulated vehicle made up of articulated half-sections or units substantially the same ride smoothness as a rigid vehicle of equal length, without encountering high bending stresses in the frame and joint structure. This objective can be achieved once the dynamics of a vehicle incorporating a joint with unrestrained freedom about both longitudinal and transverse pivots is understood. The longitudinal freedom permits the two halves of the vehicle to conform to the terrain so that substantially equal loads are carried by all the ground contacting elements. The freedom about the transnverse axis permits the two halves of the vehicle to conform to irregularities of terrain that are of a relatively large order of magnitude, yet the vehicle will negotiate, without serious pitching, irregularities of a lesser magnitude which are the most serious speed-limiting factor in off-road service. This is possible due to the nose-to-tail or tandem connection of the vehicle halves and thus an over-all configuration which makes it impossible to displace the nose of the leading vehicle downwardly without at the same time raising the nose of the trailing half. This is true as long as the soil beneath the front-half ground-contacting elements will support the load without failure.

Similarly, the rear-end of the leading unit cannot move downward without displacing the nose of the following unit downward. An analysis will show that the following or trailing vehicle half will be stabilized in pitch in like manner as the leading vehicle half. It is thus possible to achieve a smooth ride of the vehicle as a whole which in turn permits increased speeds, with a light and simple joint structure.

More particularly, an object of the invention is the provision of an improved articulated vehicle, preferably of the so-called tracked type, wherein the vehicle halves or units are connected by a combined articulating and steering joint which combines in a relatively simple structure means for steering the vehicle by chassis articulation and means permitting universal movement of the vehicle units about longitudinal and transverse axes which are fixed relative to the front and rear units respectively, as allows said units to conform to the topography of the terrain over which the vehicle is traveling without the frame proper or hull(s) of the vehicle being subjected to high bending stresses and with low suspension movements and stresses.

Another practical object of the invention is the provision of a combined articulating and steering joint of the last stated character whose configuration is generally tubular, thereby permitting passage of a universal jointed driveline through its center wherein it is effectively shielded and protected.

A further object of the invention is the provision of a combined articulating and steering joint for articulated tracked vehicles which mounts hydraulic means in the form of rams for articulating the front unit relative to the rear unit, thereby to steer the vehicle by so-called chassis-articulation, and whose construction and configuration are such as not only to greatly simplify the mechanical connections of the hydraulic cylinder with both rear unit and the joint, but also to keep all relative motion so far as the cylinders are concerned in a single plane, thereby to free the cylinders and their connections from bending and twisting strains.

Yet another object of the invention is the provision of a combined articulating and steering joint which, although providing the units with joint freedom about longitudinal and transverse axes as aforesaid, results in the vehicle tending to ride like a rigid machine of wheel base length equal to that of the overall flexible configuration. Thus, rather than the simplicity of the joint as a whole having been attained by paying a high price in terms of "ride," the herein joint makes for an articulated vehicle having better and smoother riding properties than was hitherto considered possible.

The above and other objects and features of advantage of a combined articulating and steering joint for articulated tracked vehicles according to the present invention will appear from the following detailed description thereof taken with the annexed drawings illustrating a preferred (all-purpose) and modified embodiment thereof, wherein:

FIG. 1 is a perspective view looking on a side of a combined articulating and steering joint for an articulated tracked vehicle according to the invention, the coupled front and rear units of such a vehicle being only schematically shown in broken lines;

FIG. 2 is a front-to-rear perspective view of the combined articulating and steering joint illustrated in FIG. 1, the view further generally illustrating the protective relationship of the joint in respect to a driveline extending substantially coaxially therethrough;

FIG. 3 is a broken-away part-sectional side elevation of the coupling ring and related components of the joint shown in FIGS. 1 and 2;

FIG. 4 is a section taken generally along line 4—4 of FIG. 3;

FIG. 5 is a detail view illustrating an effective form of connection between the rear-unit member which is rigid with the vehicle rear unit and the inner coupling ring of the joint;

FIG. 6 is a detail sectional view taken on line 6—6 of FIG. 4, illustrating a preferred form of connection between a hydraulic power cylinder employed in steering the vehicle and said inner coupling ring element;

Figure 9:
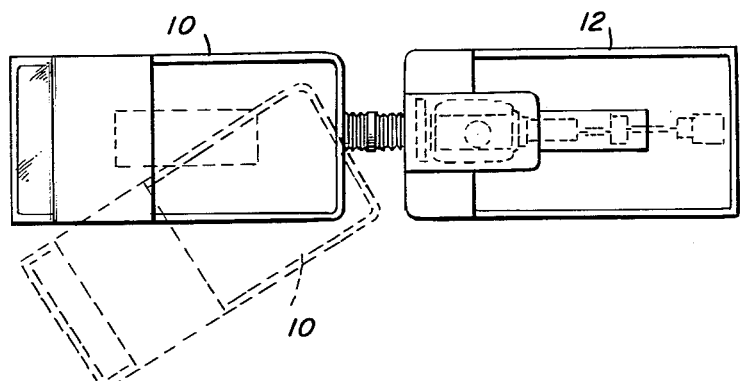
Figure 10:
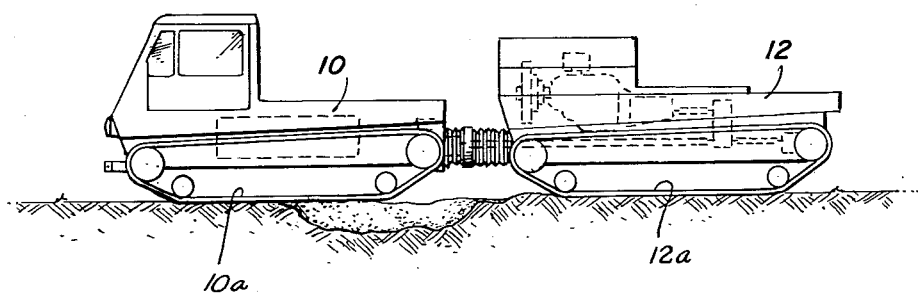
Figure 11:
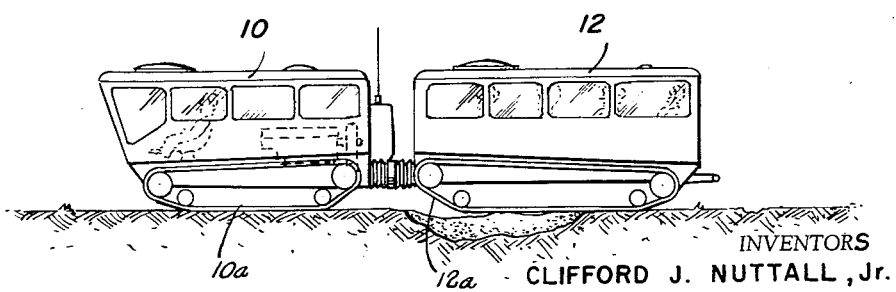

FIGS. 9 and 10 are plan and side elevational views, respectively, illustrative of one type of articulated vehicle to which the herein combined articulating and steering joint is ideally suited, FIG. 10 further illustrating how the joint assists the vehicle in tending to ride like a rigid machine of wheel base equal to that of the overall flexible configuration; and FIG. 11 is a view similar to FIG. 9 but illustrating yet another type of articulated vehicle employing the combined articulating and steering joint as herein proposed.

Referring to the drawings, and more particularly to FIGS. 1–7, reference numerals 10 and 12 designate the front and rear half units, respectively, of an articulated tracked vehicle which are both coupled and rendered steerable with respect to one another by the combined articulating and steering joint of the invention now to be described in detail and which is sometimes hereinafter referred to as a combined coupling and steering joint. As will be seen from the aforesaid FIGS. 1–7, taken with FIGS. 9, 10 and 11, the vehicle half units 10 and 12 are each stable vehicles in themselves and are supported on endless ground-contacting or engaging treads 10a and 12a. According to the preferred form thereof, such a joint includes a tubular draft and/or buffer or push member 14 rigidly and structurally connected to the frame or hull of the rear unit 12 so as to extend longitudinally-forwardly therefrom and which mounts at its forward end a pair of vertically spaced extended lugs 16, 18 terminating at their free ends in horizontally disposed ears 16a, 18a; a corresponding front-unit "member" illustratively in the form of a pair of laterally spaced arms 20, 22 rigidly and structurally affixed to the frame or hull of the front unit 10 so as to extend longitudinally-rearwardly therefrom and which terminate at their free (rearward) ends in vertically disposed ears 20a, 22a; and a coupling ring assembly connecting said rear- and front-unit members.

More particularly, the aforesaid vertically spaced, horizontally disposed ears 16a, 18a extending from the rear-unit member connect to a pair of inwardly directed studs 24, 26 which are affixed to and extend radially inwardly from and on a vertical diameter of the inner coupling ring 28 of said coupling ring assembly, which, as best seen in FIG. 3, further includes an outer coaxially related coupling ring 30. Said outer coupling ring 30 mounts a corresponding pair of studs 32, 34, it being observed that the latter studs extend outwardly from and are disposed on a horizontal diameter of said outer ring, thus to connect with the ears 20a, 22a of the front-unit arms 20, 22. Rather than the aforesaid ears 16a, 18a and 20a, 22a directly bearing on their studs, each of said studs preferably mounts a spherical bearing member 36 to which the ear apertures are complementally shaped, whereby the ears and spherical members act as ball-socket bearings. Preferably also, the ears and the ball-socket bearings are suitably enclosed for their protection, and for this purpose the inner coupling ring 28 mounts the ear-enclosing U-brackets 38a, 38b therefrom at opposed points so as to extend about the ears 16a, 18a and their ball-socket bearings; and the outer coupling ring 30 is provided with similar but outwardly extending U-brackets 40a, 40b positioned to enclose the ears 20a, 22a and their ball-socket bearings. It will also be seen that said brackets serve to support the free ends of the studs, i.e. the inner ends of the studs 24, 26, and the outer ends of the studs 32, 34.

The aforesaid coupling rings 28 and 30 are freely rotatable with respect to one another, but at the same time they are restrained from slipping out of or moving substantially away from one another as by matching screw threads on the outer peripheral surface of the inner ring 28 and on the inner peripheral surface of the outer ring 30, respectively. Thus, with the construction so far described, it will be seen that the front-unit arm members 20, 22 (and hence the front unit 10) may swivel relative to the rear-unit tubular member (and hence the rear unit) about the common axis of the rings 28, 30, and vice versa. Also it will be apparent that the front-unit arms 20, 22 (and accordingly the front unit 10) may pivot with respect to the coupling ring assembly (and hence to the rear unit) about the horizontal axis of the studs 32, 34 which is of course fixed relative to the vehicle front-unit. Finally, it will be seen that said front-unit arms 20, 22 in unison with the coupling ring assembly may pivot about the vertical axis of the studs 24, 26 which is fixed relative to the rear unit of the vehicle.

Since steering of articulated vehicles by so-called chassis articulation is achieved by pushing the front unit of the vehicle relative to rear unit thereof about a vertical axis disposed between the vehicle units (which in the present joint is provided by the vertical axis of the studs 24, 26), it is a further feature of the invention that the joint as herein proposed includes means for "pushing" the front unit 10 relative to the rear unit 12 in one direction or the other about the axis of said studs 24, 26. More particularly, the present coupling and steering joint mounts a pair of double-acting hydraulic rams 44, 46 disposed symmetrically to the sides of the rear-unit member 14, whose cylinders extend through suitable holes provided therefor in the front end of the hull of the rear unit and are connected at their rear ends to suitable means (such as the lugs 48, FIG. 7) affixed to the frame or chassis of said rear unit so as to be reactive thereagainst. The forward ends of the ram plungers each terminates in a clevis 50, and the plungers thereby connect to laterally extending ears 52 (FIG. 6) which are rigidly affixed to the aforesaid inner coupling ring 28 at opposite points on the horizontal diameter thereof. Thus, the hydraulic rams 44, 46 are each reactive at their forward or working ends against inner coupling ring 28 and accordingly, as either ram is extended (with such extension being accompanied by retraction of the opposite ram through the hydraulic supply system interconnecting said rams), the front unit is pushed about the vertical axis of said studs 24, 26 in desired amount and direction, thereby to steer the vehicle by chassis articulation.

Extension of one and corresponding retraction of the other of said hydraulic rams 44, 46 is effected by an hydraulic servomotor system (not shown) controlled from a driver's station usually provided on the front unit of the vehicle. Since such is per se old in the vehicle steering art, no detailed description thereof is believed necessary here.

Figure 7:
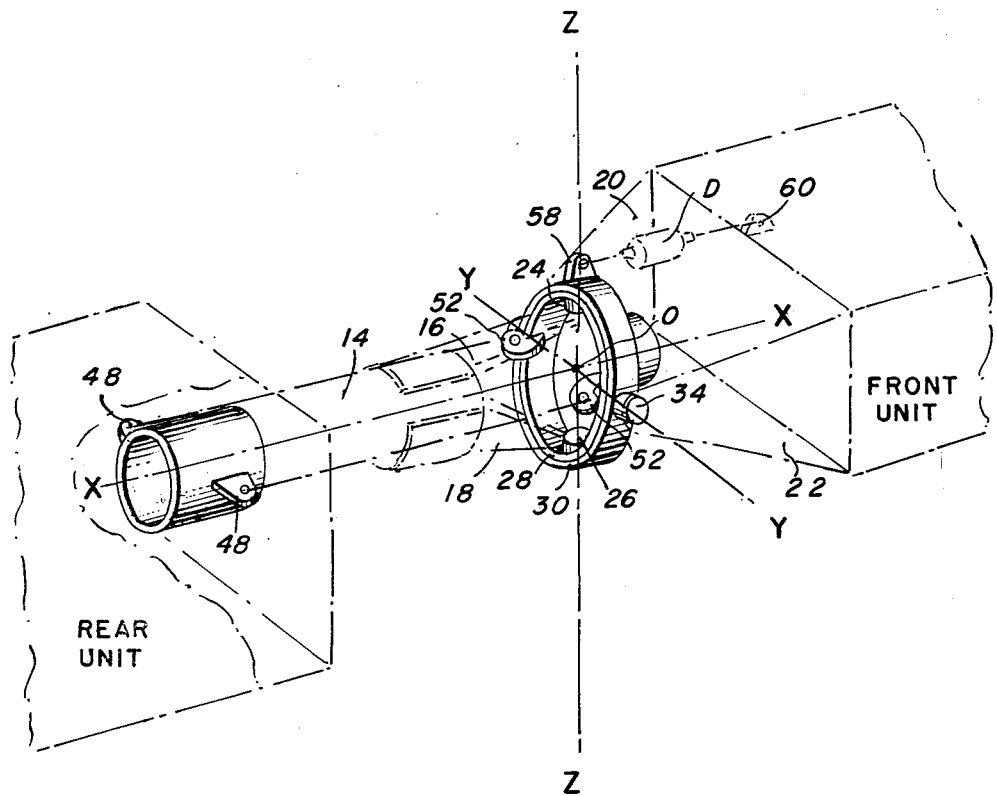
FIG. 7 is a diagrammatic view of a combined articulating and steering joint according to the prior figures, the view omitting the power rams used for steering since its primary purpose is to illustrate the three joint axes about which the coupled members rigid with the vehicle front and rear members (and thereby the units) have freedom of movement.

Referring to the diagrammatic FIG. 7, it will be seen that the present combined coupling and steering joint, when properly proportioned, will move the front unit 10 relative to the rear unit 12 about the steering axis Z—Z (corresponding to the axis of the studs 24, 26) at will, and from this view, taken with FIGS. 1 and 2, it will be observed that the rams 44, 46 also act exclusively in a horizontal plane which is fixed relative to the rear unit; hence the rams operate under the high forces as are required to steer the vehicle without being subject to any twisting or bending stresses. At the same time, relative angular motion of the front and rear units of the vehicle about axis Y—Y (corresponding to the horizontal axis of the studs 32, 34) and about axis X—X, which is the common axis of the coupling rings 28, 30 is not only permitted, but is in fact unhampered, thereby allowing the front and rear units to conform to the geometry of the surface over which the vehicle is moving without high bending stresses in the frame proper or hull(s) of the vehicle and with reduced suspension movements and stresses.

Another feature of advantage of a combined coupling and steering joint as described is that its generally tubular configuration permits the passage of a universal-jointed driveline 54 (FIG. 2) supplying drive from one or the other of the units (depending on which unit of the vehicle mounts the engine) through its center in a position where it is protected, and wherein changes in driveline lengths due to any relative motion of front and rear units is minimized. Thus, if a constant-velocity driveline joint is located at the intersection 0 (FIG. 7) of the aforesaid X—X and Z—Z axes, there will be no change in driveline length as the units articulate. A short double-universal jointed shaft with its center at 0 may be employed in place of the aforesaid constant-velocity joint since such will have but very small change in length consequent to the double joints working at the same angle, thus equalizing loads and insuring, even with simple universal joints (properly installed), that the output across the shaft section will be of constant velocity, of course assuming that input is constant.

The aforesaid configuration of the combined coupling and steering joint of the invention also greatly simplifies the mechanical connections of the hydraulic power cylinders 44, 46 both to the rear unit 12 and the inner coupling ring 28 (and hence to the front unit) by keeping all relative motion, so far as the cylinders are involved, in but a single plane fixed relative to the rear unit.

Another notable feature of the combined coupling and steering joint of the invention when employed to couple and steer an articulated tracked vehicle (as distinguished from wheeled vehicles) is that, despite the joint freedom about both axes X—X and Y—Y which it provides, the vehicle tends to ride like a rigid machine having wheel base equal to that of the overall flexible configuration of the vehicle. Such is generally illustrated in FIGS. 10 and 11, of which FIG. 10 illustrates the articulated vehicle riding substantially like a rigid machine, despite the fact that the rear end of its front unit 10 is traveling over a ditch or equivalent depression in the terrain, and FIG. 11 illustrates the same desirable feature despite the fact that the front end of the rear unit 12 has reached and is riding over the ditch or depression. Thus it will be seen that the high effectiveness and unusual simplicity of the combined coupling or articulating and steering joint of the invention has not been attained at a high price in relation to "ride," i.e. more complicated joints rigid about axes X—X and/or Y—Y. Also, should regular ground "waves" which when taken at a certain speed produce synchronous pitching of the two units be encountered, as in the wind-sculptured trails of the Greenland Ice Cap or in the Antarctic region, a suitable hydraulic or friction damper may readily be added to damp rotations about the Y—Y axis. Such a damper indicated at D (FIG. 7) is shown as connected between a lug 58 on outer coupling ring 30 and a fixed lug 60 on the front unit. Again, installation of such a damper is simplified by the single rotary motion permitted between the damper-connected parts, i.e. ring 30 and front unit.

Figure 8:
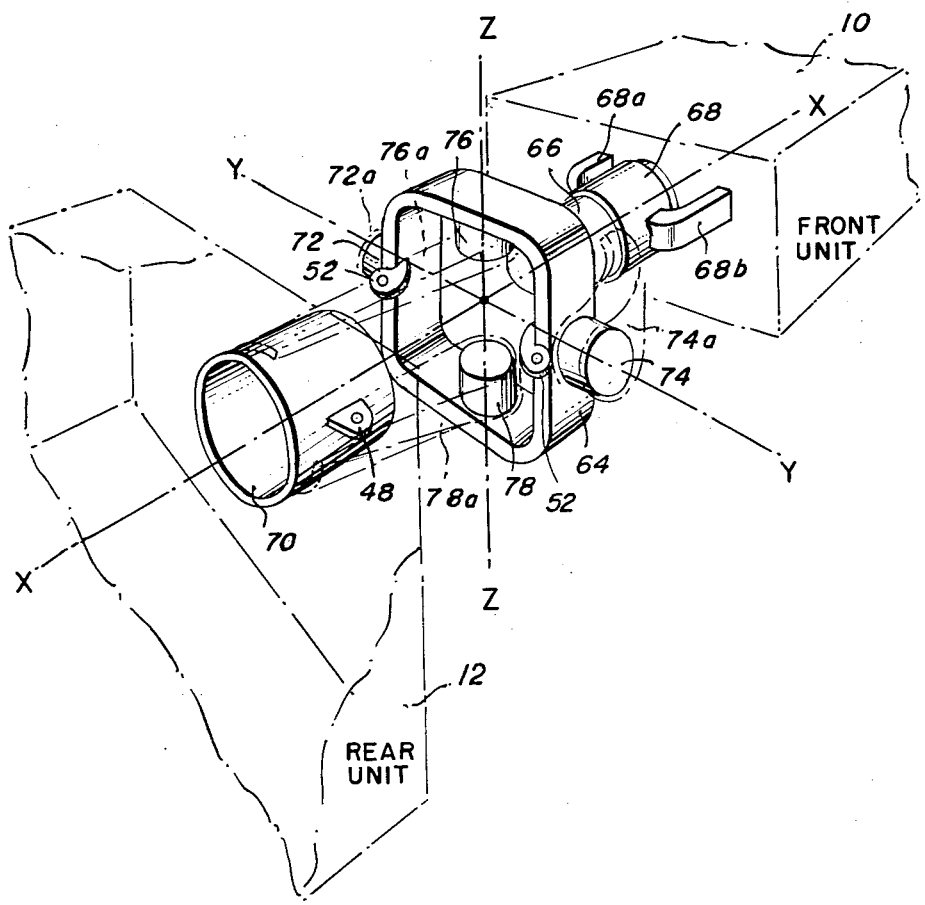
FIG. 8 is a perspective view similar to FIG. 7 illustrating a modified form of articulating and steering joint of the invention.

While very similar in design to the FIGS. 1–7 form of coupling and steering joint as described, the modified design illustrated in FIG. 8 provides some saving in space in that the larger and heavier rotary coupling rings 28, 30 of the first described form are replaced by a shorter, single rectangular stud ring 64, with relative rotation between front and rear units about axis X—X (as supplied by the aforesaid coupling rings of the prior modification) being instead supplied by small-diameter, inner and outer coupling tubes 66, 68, respectively, said tubes being rotatable about a common axis and connected to one another against any axial separating movement. The aforesaid outer tube 68 is rigidly affixed to the rear end of the front unit 10 to extend longitudinally-rearwardly therefrom as by attaching arms 68a, 68b (corresponding generally to the aforesaid arms 20, 22 of the first modification), and said inner tube 66 is effectively connected to the tubular member 70 (corresponding to the aforesaid rear-unit tubular member 14) through the stud ring 64, as will now be described. The Y—Y axis in the modified form is provided by aligned, horizontally disposed studs or trunnions 72, 74 shown to extend laterally from the sides of the stud ring 64 and connected to said studs are ears 72a, 74a which extend laterally from the rotary inner tube 66.

The Z—Z axis is provided by the aligned, vertically disposed studs or trunnions 76, 78 shown to extend inwardly from the top and bottom sides of the stud ring 64, to which connect ears 76a, 78a (corresponding to the ears 16a, 18a of the first described modification) which extend to and are affixed to the aforesaid rear unit tubular member 70.

While the aforesaid mounting and arrangement of the fixed inner and rotary outer tubes 66, 68 sacrifices to a degree the ease of using a damper or shock absorber if desired, as by permitting axis Y—Y to rotate about axis Z—Z (in the present modification fixed relative to the rear unit 0), a damper operative between the rectangular stud ring 64 and the rotary inner coupling tube 66 having the same features as the damper illustrated in FIG. 7 is possible.

While the above design shows one set of studs within and another set without the rectangular stud ring 64, the design is obviously sufficiently flexible as to provide for both sets of studs being mounted either inside or outside said ring member, depending on particular design requirements.

Referring briefly to FIGS. 9–11, these views illustrate but two of the many possible body and chassis arrangements of the basic articulated tracked vehicle design made possible and highly practical by the combined coupling and steering joint of the present invention. Thus, FIGS. 9 and 10 typify a form of cargo carrier powered by an engine mounted on the rear tracked unit and driving both front and rear tracked units through their respective differentials. The driveline from the rear engine to the front-unit differential is of course through the combined coupling and steering joint which, incidentally, is not seen in detail since it is housed within an accordion-type weather tube of suitable material and construction. It will be understood that all controls are operated from the driver's cab on the front unit, with both front and rear units providing valuable cargo space.

FIG. 11, on the other hand, shows the basic design adapted for use as a Greenland personnel carrier, for example. For such use, each unit mounts a so-called Arctic cab, the front or driver's cab seating up to six persons including the driver, and the rear-unit cab seating, say, eight persons. It will be noted that the FIG. 11 vehicle shows a further adaptation as respects the engine being mounted on the front unit, and driving both units, the rear unit via a driveline passing through the combined coupling and steering joint of the invention.

In addition to the above, the high basic over-the-snow mobility combined with good riding qualities over rough terrain which characterize articulated tracked vehicles incorporating the combined coupling and steering joint of the invention make such vehicles ideally suited for exploration and research, for defense, i.e. as missile carriers, etc., for ambulance and litter-carrier use, in both the Arctic and Antarctic regions. Also, the excellent snow-going mobility of such a vehicle makes it highly useful around ski, hunting and fishing resort areas. Also, the basic chassis design lends itself readily to an articulated type amphibian whose relatively great length and hull simplicity makes possible speeds of ten miles per hour and over with the available power. Steering by articulation in the water solves numerous problems encountered in amphibians generally, with the track layout of the articulated tracked vehicle lending itself readily to the design and incorporation of an efficient propeller system.

Without further analysis, it will be apparent that combined coupling and steering joints for coupling the front and rear units of an articulated vehicle and for steering such a vehicle by chassis articulation, all as illustrated and described in the foregoing, achieves the objectives of such a coupling and joint as earlier outlined. However, as many changes could be made in carrying out the above constructions without departing from the scope of the invention, it is intended that all matter contained in the above description or shown in the accompanying drawings shall be interpreted as illustrative and not in a limiting sense.

We claim:
1. An articulated transport vehicle adapted for both on- and off-the-road service and comprising, in combination, at least two stable vehicle units arranged in tandem, power means for said vehicle mounted on one of said units, a combined articulating and steering mechanism positioned and operative in the space between said units and connecting said units together, said mechanism comprising draft members rigidly affixed to and extending longitudinally-rearwardly and longitudinally-forwardly, respectively, from the frames of said front and rear vehicle units, universal joint means connecting said members and providing for continuous freedom of motion of said members and thereby of said units with respect to one another about vertical, horizontal and longitudinal axes of said joint means under all conditions of vehicle operation, and at least one means connected to and reactive in opposite directions between the frame of one of said vehicle units and said joint means, respectively, for positively controlling movement of said units about said vertical axis, thereby to effect steering of said vehicle, while at the same time maintaining the aforesaid freedom of movement of said units about said horizontal and longitudinal axes, each such last means being substantially contained and reactive in a plane which is fixed in relation to said one vehicle unit to which said means is connected via its frame.

2. An articulated transport vehicle according to claim 1, wherein the means for controlling movement of the vehicle units about said vertical axis is connected to and reactive on the frame of the rear unit.

3. An articulated transport vehicle according to claim 1, wherein said members and universal joint means have a generally tubular configuration, thereby to provide a protective enclosure for a drive line extending from said power means mounted on one of said units to the other of said units.

4. An articulated transport vehicle according to claim 1, wherein said stable vehicle units are each of the tracked type being supported on ground-engaging endless tracks.

5. An articulated transport vehicle according to claim 1, wherein said universal joint means comprises inner and outer ring-form members threadedly interconnected for angular motion with respect to one another about their common axis comprising the longitudinal axis of said joint means, one of said ring members being pivotally connected to said draft member of one vehicle unit for angular movement about a vertical axis fixed with respect to said one vehicle unit and which comprises the vertical axis of the joint means, and the other of said ring members being pivotally connected to said draft member of the other vehicle unit for angular movement about a horizontal axis fixed with respect to said other vehicle unit and which comprises the horizontal axis of said joint means.

6. An articulated transport vehicle according to claim 5, wherein the outer ring member is pivotally connected to said draft member of the front vehicle unit and the inner ring member is pivotally connected to said draft member of the rear vehicle unit.

7. An articulated transport vehicle according to claim 6, wherein all said vertical, horizontal and longitudinal axes intersect at the geometric center of said ring members.

8. An articulated transport vehicle according to claim 1, wherein said universal joint means comprises a single ring member, means connecting said ring member to one vehicle unit for angular motion about a vertical axis comprising the vertical axis of the joint means and including the draft member extending from said one unit, inner and outer coupling tubes threadedly interconnected to one another for angular motion relative to one another about their common axis comprising the longitudinal axis of said joint means, said tubes being displaced from the ring member in the direction of the other of said vehicle units, means connecting said ring member to one of said coupling tubes for angular motion about a horizontal axis comprising the horizontal axis of the joint means, the other of said coupling tubes being rigidly connected to said other vehicle unit by the draft member extending therefrom as aforesaid.

9. An articulated transport unit according to claim 5, wherein said means for controlling movement of the vehicle units about said vertical axis is reactive between said one of said vehicle units and said one ring member.

10. An articulated transport member according to claim 1, wherein said means for controlling movement of the vehicle units about the vertical axis comprises a pair of hydraulic rams connected to and reactive between said one of said vehicle units and said joint means, the rams of said pair thereof being disposed to opposite sides of the longitudinal axis of the joint means.

References Cited in the file of this patent
UNITED STATES PATENTS

| | | |
|---|---|---|
| 1,704,296 | Ledwinka | Mar. 5, 1929 |
| 1,965,985 | Morgan | July 10, 1934 |
| 2,368,202 | Clark | Jan. 30, 1945 |
| 2,391,971 | Hollos | Jan. 1, 1946 |
| 2,532,785 | Richter | Dec. 5, 1950 |
| 2,594,695 | Storey | Apr. 29, 1952 |
| 2,681,812 | Stover | June 22, 1954 |
| 2,883,774 | Clifford | Apr. 28, 1959 |
| 2,933,143 | Robinson et al. | Apr. 19, 1960 |

FOREIGN PATENTS

| | | |
|---|---|---|
| 842,007 | Germany | June 23, 1952 |